US007826391B2

(12) United States Patent
Van Slyke et al.

(10) Patent No.: US 7,826,391 B2
(45) Date of Patent: *Nov. 2, 2010

(54) SYSTEM AND METHOD FOR MANAGING BROADBAND SERVICES

(75) Inventors: John Porter Van Slyke, Lafayette, CA (US); Raghvendra G. Savoor, Walnut Creek, CA (US); Baofeng Jiang, Pleasanton, CA (US); John Cioffi, Atherton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/253,857

(22) Filed: Oct. 17, 2008

(65) Prior Publication Data

US 2009/0040939 A1 Feb. 12, 2009

Related U.S. Application Data

(63) Continuation of application No. 11/037,901, filed on Jan. 18, 2005, now Pat. No. 7,453,822.

(51) Int. Cl.
*H04J 1/16* (2006.01)
*H04L 12/56* (2006.01)

(52) U.S. Cl. .................. 370/252; 370/395.21; 370/386

(58) Field of Classification Search ................. 370/252, 370/352, 386, 395.21; 379/88.17
See application file for complete search history.

(56) References Cited

U.S. PATENT DOCUMENTS

| 7,027,418 | B2* | 4/2006 | Gan et al. ............... 370/329 |
| 2002/0039352 | A1 | 4/2002 | El-Fekih et al. | |
| 2007/0050522 | A1* | 3/2007 | Grove et al. ............ 709/246 |

FOREIGN PATENT DOCUMENTS

| WO | 96/07281 A1 | 3/1996 |
| WO | 00/72183 A2 | 11/2000 |
| WO | 01/17169 A2 | 3/2001 |

OTHER PUBLICATIONS

European Search Report, European Patent Application No. EP 06 71 8725, dated Feb. 22, 2010, 8 pages.

* cited by examiner

*Primary Examiner*—John Pezzlo
(74) *Attorney, Agent, or Firm*—Jackson Walker L.L.P.

(57) ABSTRACT

A system and method are described for selecting a service state using a configurable abstraction layer. A comparison is made between network parameters of a Network Performance Layer and network services of a Service Layer. Once network parameters are within a threshold for providing a given service, a state change can be made in the configuration parameters to suit the provided service.

17 Claims, 4 Drawing Sheets

SYSTEM AND METHOD FOR MANAGING BROADBAND SERVICES

BACKGROUND OF THE INVENTION

1. Field of the Invention

The present invention relates to the field of providing communications services. In particular, the present invention relates to a system and method that provides a service state table that matches an operational specification for a service application such as video or voice to a performance capacity of a communications network to provide the service application to a particular customer.

2. Description of the Related Art

Current broadband communication networks, such as ADSL (Asynchronous Digital Subscriber Line) networks provide services such as voice, data, and video to a customer. Hyper Text Transfer Protocol (HTTP), service is commonly provided for web browsing. Voice communication service can be provided using example, Voice over Internet Protocol (also referred to as Voice over IP, or VoIP). VoIP is a method of transferring audio signals using Internet Protocol. VoIP is a commonly used protocol for transferring voice data over Internet connections. Video can be provided using high volume continuous data streams over an Internet connection.

Services such as these are provided by transferring data over a high speed network connection between a service provider (SP) network and a customer. The network comprises dedicated or shared physical layers (i.e., phones lines, fiber optics) which have highly variable and dynamic operating parameters. A variety of protocols are employed for transferring the data over the SP network. An ADSL connection, for example, operates over existing telephone lines. An ADSL connection comprises a variety of network elements such as a modem for connecting a customer to the Internet, an Internet Protocol (IP) layer for routing data, and asynchronous transfer mode (ATM) network layer for transfer of data cells through an asynchronous transfer mode network.

There are a number of standard engineering specifications involved in providing a service from an SP network to a customer. One group of specifications configures provided services and another group of specifications describes the parameters of the network connection over which the service is provided. On an abstract level, these two groups of specifications are referred to as the "Network Performance Level" (which indicates performance parameters related to the SP network and the "Service Level" (which indicates configuration parameters related to the service provided).

Code Violation Tolerance (CVT) is an example of a performance parameter of the Network Performance Level. CVT indicates a tolerable level of noise which can be present on a network while providing a given service. High levels of noise usually lead to a need to retransmit data lost due to noise. The level of noise that can be tolerated (CVT) usually depends on the type of service being provided. Video service typically requires a lower CVT than a web browsing service. For example, a video service comprises a steady stream of data being provided to an end user. A large amount of noise on a network providing video service would require significant data retransmission and become disruptive to the video viewing experience (i.e., the video image might stop or produce visual anomalies). Thus, in order to provide a video service to a customer, a low CVT, is desired, on the network. In comparison web browsing can be performed over a relatively noisy network. The web browsing data stream is usually intermittent so that there is more opportunity to retransmit data lost to high noise levels without disrupting the browsing experience. Thus, the operating level of network parameters, such as CVT, varies depending upon the service being provided.

Within the Service Layer, each service has a variety of configuration parameters pertaining to one or more network elements. For instance, web browsing has a different set of configuration parameters for data transfer through a modem than for data transfer through an ATM switch. A service can be provided when parameters of the Network Performance Layer as well as the configuration parameters of the Service Layer are met. A service state change occurs whenever a customer switches from one service to another (i.e., from web browsing to video) or from one network element to another (ATM to IP). Whenever there is a "state change", a different set of network parameters and service configurations are considered.

Providing services, managing bandwidth allocation, and assuring a quality of service should not be one-time activities conducted only upon activation of the service to the customer. Rather, these parameters are constantly being updated in order to adapt to both dynamic and evolving service offerings and performance conditions. The current approach to providing services is often hard coded and employs a reactive brute force single service management approach. For the most part, Service Layer operations and Network Performance Layer data are often administered in a mutually exclusive manner. Current service management methods tend to rely on an architecture in which there is little monitoring of the network which tends to reduce the flexibility of the network. Current service management methods reduce support for the diverse and complex services having widely varied performance criteria, and hinders reaction to evolving conditions, such as changes in services or noise levels on the network. Thus, there is a need for a flexible solution for automating state changes based on network performance and service changes.

SUMMARY OF THE INVENTION

A system and method are provided for establishing a configurable abstraction layer referred to as a Service State Translator (the "Translator") between a Network Performance Layer and a Service Layer. The Network Performance Layer comprises performance criteria for operation of a service over a network layer. Network performance criteria include, but are not limited to, noise levels and network connection speed. Network services include, but are not limited to, web browsing using HTTP, VoIP and streaming video. The present invention compares or correlates between the configuration state of the service in the Service Layer and network performance parameters of the network element within the Network Performance Layer to determine a service state. When the network performance parameters satisfy the threshold levels specified in the Network Performance Layer, the service is provided using the configuration states specified in the Service Layer. In one aspect of the invention, the present invention provides a system and method for managing services in a network. The present invention specifies a service in a network service layer, specifies at least one network performance criterium for the service in a network performance layer, determines a network performance measure, compares the network performance measure to the network performance criterium and manages the service in the network based on the comparison.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention, through one or more of its various aspects and/or embodiments is presented to provide one or more advantages, such as those noted below.

The present invention provides an automated framework for managing broadband services. The present invention provides a "Service State Translator" (hereafter referred to as the SST) for specifying a service offering for the Service Layer that can be delivered to a particular subscriber based on actual network performance and operating capabilities of the Network Performance Layer. Conversely, the SST of the present invention also provides a mechanism for providing the network performance criteria of the Network Performance Layer to meet a desired service offering of the Service Layer that a customer has purchased or wants to purchase.

Regardless of what network medium is provided and how its controlled, the present invention extracts key fundamental service related parameters from the network and uses them to assess at a high level, what services are available over the network. The services can be different depending on what the service provider (SP) is implementing. The present invention provides an SST structure that works with any network topology or architecture as well as any operational support system structure (OSS) or set of services. Thus the SST structure of the present invention abstracts the network topology, services offered and control there to a high level that is applicable to control any underlying network topology and set of services.

The SST structure provided by the present invention is easily configurable to apply to a variety of network and network service configurations. If a service provider changes an OSS (including but not limited to as sales and ordering marketing or provisioning transaction flows down to the network management layer) the SP does not have to change the SST structure table provided by the present invention. The SP simply reconfigures, that is, repopulates or changes the values in the SST table structure 200. Repopulating the SST table structure does not involve any programming changes as to how the SP controls the network or provides services. Similarly, if the SP changes its network technology or topology, the SP does not have to reprogram how service layer interacts with the network.

Figure 1:
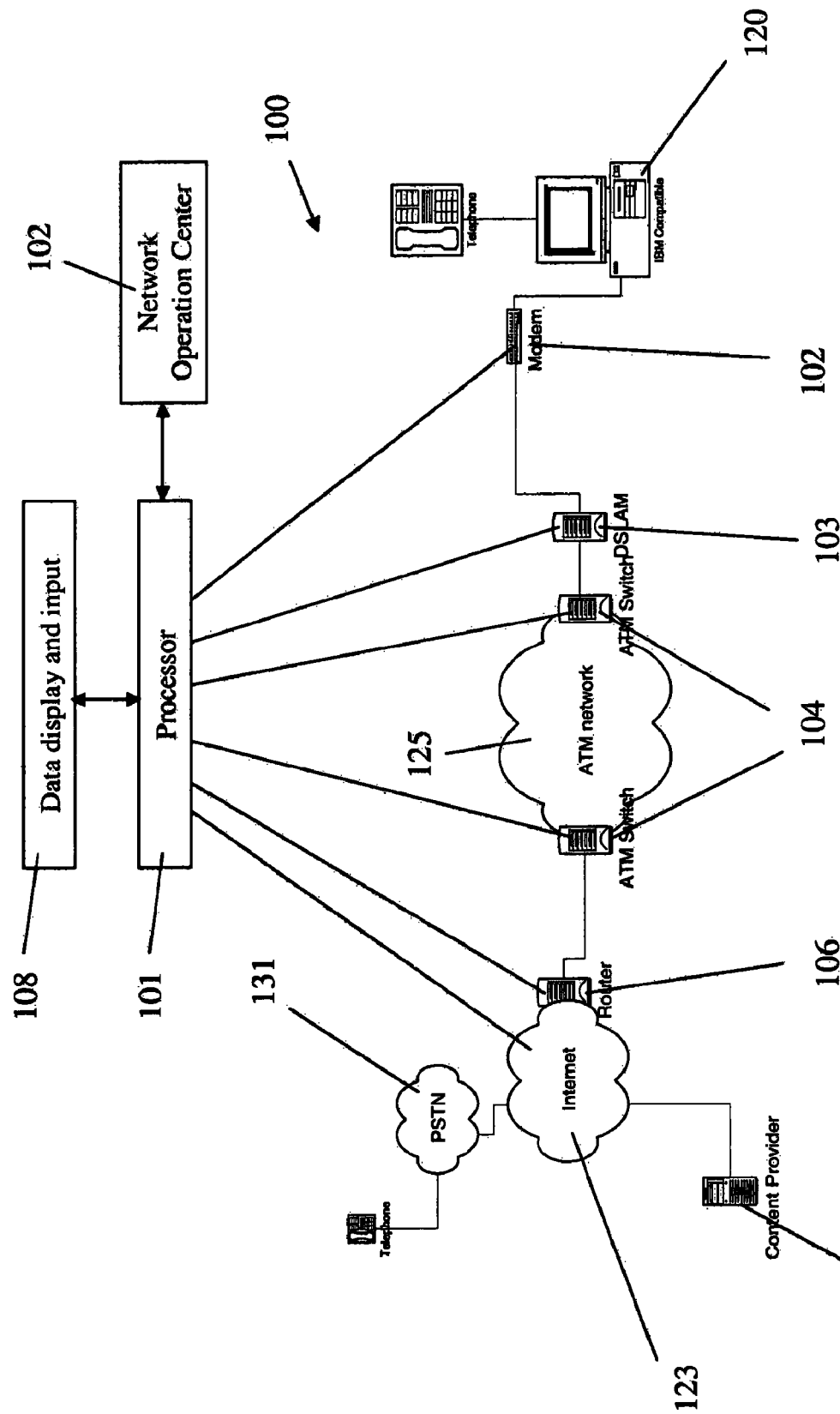
FIG. 1 illustrates broadband network in which the present invention operates.

FIG. 1 shows an exemplary broadband network 100 for purposes of illustration of the present invention. The network 100 comprises a modem 102 processor and memory 101, a DSLAM (Digital Subscriber Line Access Multiplexer) 103, ATM (Asynchronous Transfer Mode) switches 104, a router 106 for providing connectivity between a content provider computer 113 and Customer Premises Equipment (CPE) 120 such as a personal computer (PC). Processor 101 includes data entry and display terminal 108. A DSLAM is a mechanism at a phone company's central location that links many customer DSL connections to a single high-speed ATM line. When the phone company receives a DSL signal, an ADSL modem with a plain old telephone service (POTS) splitter detects voice calls and data.

Data is sent over the network 100 from a content provider computer 113 to a CPE 120 by passing through Internet 123, router 106, various ATM switches 104 (which transfer data over an ATM network 125), DSLAM 103 and modem 102. Data transfer can occur in the opposite direction as well. Voice calls are sent to the public switched telephone system (PSTN) 131. The DSLAM records ATM cell counts for each line and stores them in memory. Network data can be acquired by the present invention running in processor 101. Data is collected from various network elements, such as the DSLAM, the ATM switch, the router, the modem, etc. By observing the various network elements, a suitable configuration can be chosen for the provided service. The SST structure provided by the present invention is initially configured by the SP at the network operation center (NOC) 102 or by a user at data terminal 108. The present invention communicates with NOC 102 to directly control the network configuration and performance or to provide recommendations for marketing or to adjust network configuration and performance parameters and to provide service reconfiguration. The number of data acquisition points shown in FIG. 1 is illustrative only, and data can be taken from any number of data points.

Figure 2:
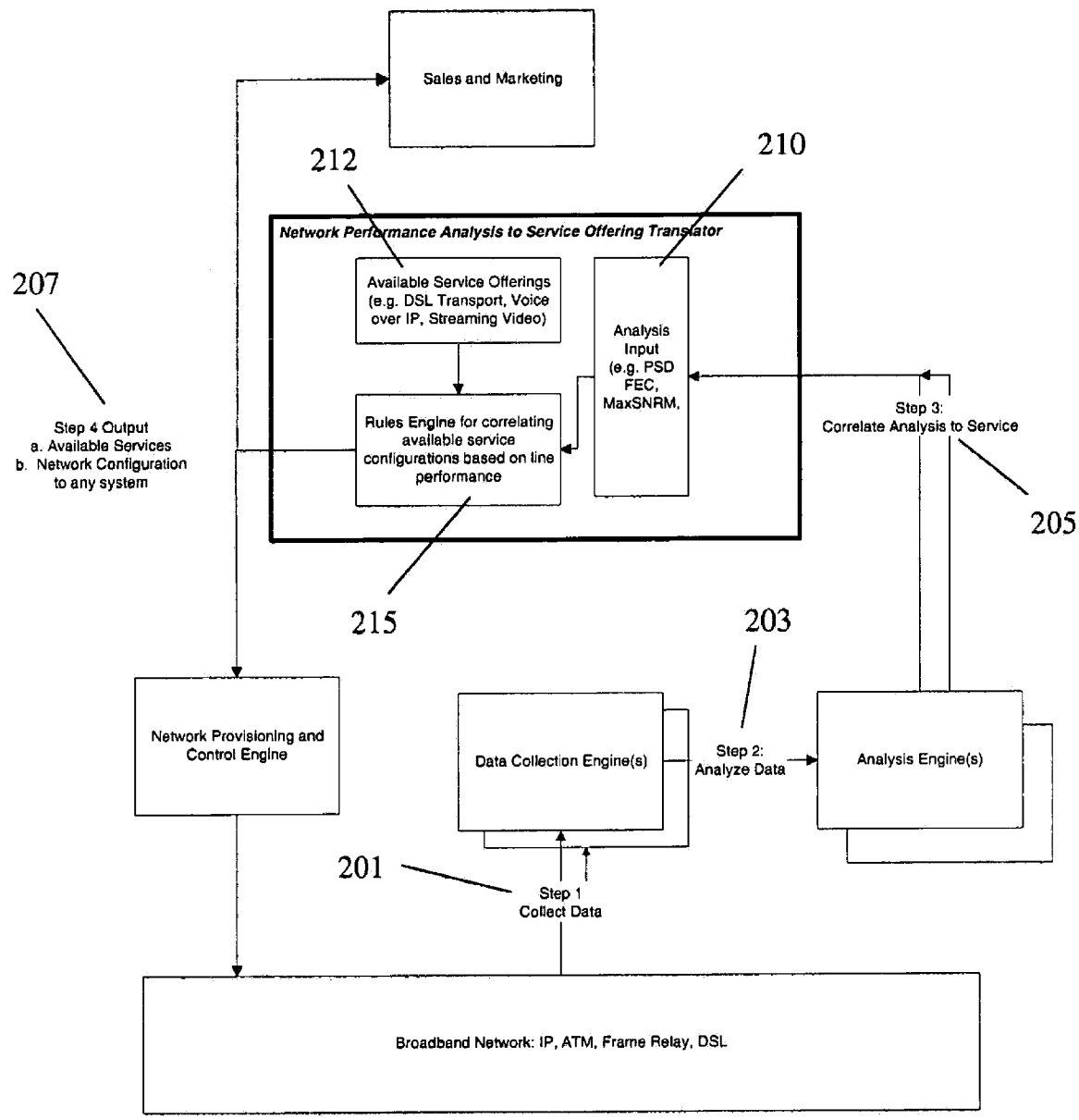
FIG. 2 illustrates an example of the system and method of the present invention.

FIG. 2 illustrates a SST table 200 structure which exists in the present invention in processor 101 memory. In one embodiment of the present invention, the SST table 200 structure exits as a structure in memory for processor 101. The SST table 200 provides an abstracted layer for correlating network parameters of the Network Performance Layer to service offerings of the Service Layer. Service offerings, such as web browsing ("3 Mbps Internet Access") 212, "Voice over IP" 214, and "Video on Demand" 216 (a service for streaming video images on a CPE), for example are shown in the columns of the SST table 200 structure. Network technologies and parameters are shown in the rows of the Translator, and are indicted by row headings "XDSL" 202, "ATM" 204, and "IP layer" 206. A service state is defined in SST table structure 200 by the combination of network performance criteria 207 and configurable states 207 for a service.

Each service state of the SST table 200 structure has an entrance or threshold criteria comprised of various network performance thresholds. These performance thresholds are stored as SST table 200 entries. SST table structure 200 entries are populated by the SP with a configuration state of services in the Service Layer where applicable and performance criteria for network elements of the Network Performance Layer where applicable. The SST table structure of FIG. 2 has been populated with some examples of representative criteria for the purpose of illustrating the present invention.

The "performance criteria" 207 indicate minimum performance thresholds for a variety of network parameters at which a state change is initiated to provide a given service. Consider as an example, when a customer requests VoIP service to be provided over an XDSL network. In order to run VoIP 214 over an XDSL network layer 202, a number of performance criteria 207 thresholds are specified in SST table structure 200. The performance thresholds should be met in order for the SP to offer or provide the service. In the example of the SST table structure as shown in FIG. 2, these performance criteria thresholds for VoIP include Code Violation Tolerance (CVT) (<200 code violations per 15 minutes) 222, a Noise Margin Tolerance (>8 db) 224, and a Relative Capacity Tolerance (<80%) 226. Once these performance criteria thresholds are met, the Translator can change the service state to provide the Voice over IP to the customer. The present invention may also request that SP change the service state to reconfigure the customer's network connection to a suitable configurable state to provide the requested service.

In the same table entry for VoIP are one or more "configurable states" 205 for providing the VoIP service over a particular network component, XDSL. Changing the service state entails operating under the configuration parameters for XDSL as specified in the SST table 200, namely: an interleaved delay 232 of less than of equal to 5 ms for error correction, a Min/Maximum Down an Up Attainable Bit Rate 234 in which the downstream bit rate is between 768 kb and 3 Mb and the upstream bit rate is between 385 kb and 768 kb. When providing VoIP service over ATM, a different set of configuration parameters of VoIP on ATM 228, 230 are considered.

The method and apparatus of the present invention supports a variety of broadband services or any broadband communications network. The SST table structure of the present invention can be configured for any combination of network technologies, performance parameters and services. The listing of network performance parameters and service offerings within the SST table structure 200 may be expanded or contracted to accommodate new network technologies of services or to remove old network technologies or services. Also, SST table structure 200 entries can be updated to reflect changes within existing network technologies or services without modification to the SST table structure 200 itself.

The present invention looks at network performance criteria 205 and configurable states 207 in SST structure 200 for a given service state to determine if a service can be offered.

Figure 3:
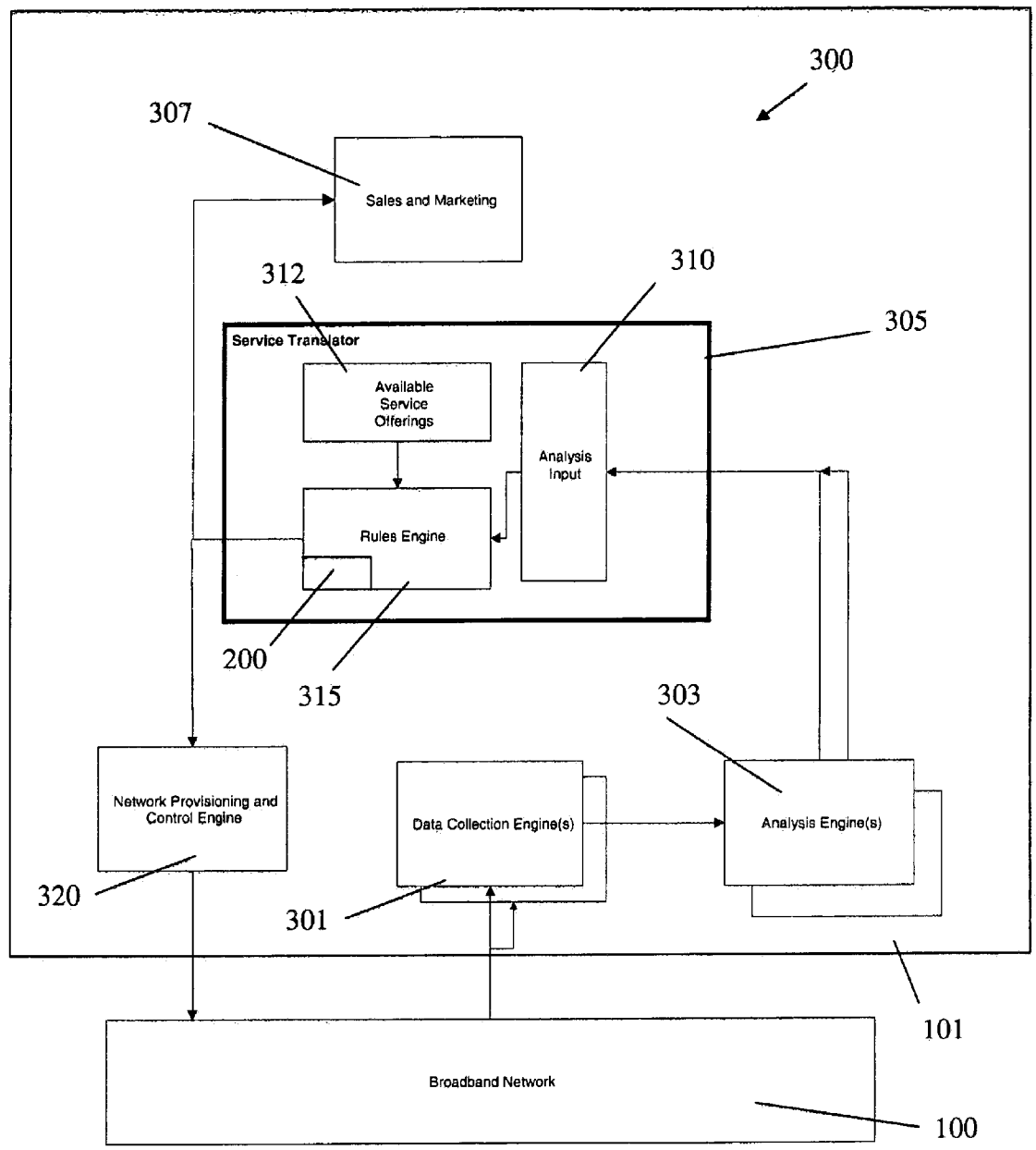
FIG. 3 illustrates a general implementation of the system and method of the present invention.

FIG. 3 shows an exemplary implementation 300 of the system and method of the present invention running on processor 101. The system and method of the present invention can be applied to a variety of network technologies and service offerings. The architecture of a network may involve any number of these network technologies, and each network technology can provide a unique set of performance attributes and service templates. Implementation 300 comprises the broadband network 100, including such devices as the router, modem, and ATM switches of FIG. 1, data collection engines 301 for collecting raw measured network performance data from the broadband network devices, and analysis engines 303 for converting raw measured network performance data into data usable in the present invention 305. The present invention 305 comprises an Analysis Input 310 (e.g. Network Performance Layer) and Available Service Offerings 312 (e.g. Service layer). Data from the analysis engines are input to the Translator 305 at Analysis Input 310. The Available Service Offerings provide configuration parameters for a variety of services. A Rules Engine 315 correlates network performance parameters to available service configurations in the SST table structure 200. Output from the present invention enables Network Provisioning and Control Engine 320 at NOC 102. In another aspect of the present invention, output can be provided to Sales and Marketing 307 for marketing analysis. An Application Programming Interface (API) to the Network Performance Analysis engine and other systems in the enterprise to automate the flow of data and associated decision making/service state translations.

The SP analyzes 303 the input from the data collection engines to provide measured network performance data and configuration analysis input 310 to the present invention. The SP filters or selects those measured network performance data to determine measured network performance data (e.g., but not limited to, maximum attainable bit rate (MABR) for upload and download, line noise, code violations, etc.) and configuration inputs which are relevant to providing service over the network. The input parameters are provided to analysis input 310. For example, the present invention determines whether a particular customer can obtain VoIP by looking at SST table structure 200. If the SP can reduce the interleaved delay below a configurable state of interleaved delay of 5 msecs (designated in SST table structure 200) without falling outside of parameters for other network performance characteristics specified in SST structure 200, then the SP can offer VoIP over XDSL to a particular subscriber. The SP directs and controls the network from the NOC. The service provider, however, may be able to reconfigure the user's communication line class of service to a higher speed line to meet the performance parameters and provide VoIP. Thus the present invention may determine that a provisioning change to a higher speed line is required to provide VoIP or that VoIP service may be sold immediately if the customer's network connection supports VoIP.

The SP may also make network changes. An SP may increase Internet access bandwidth from 3 mb to 6 mb and change a service offering from video on demand to full video service. The SP would then repopulate or reconfigure the SST table structure 200 to reflect these changes. The SP would reconfigure the SST structure 200 to reflect the new service state across the horizontal fields of the SST structure 200. If the network topology changes, for example if SP changed the network to provide IP from end to end and no longer provided ATM, the SP would simply repopulate the fields of the SST table structure 200 with the relevant IP network parameters for the new IP topology and delete the ATM parameters from the SST table structure 200.

Figure 4:
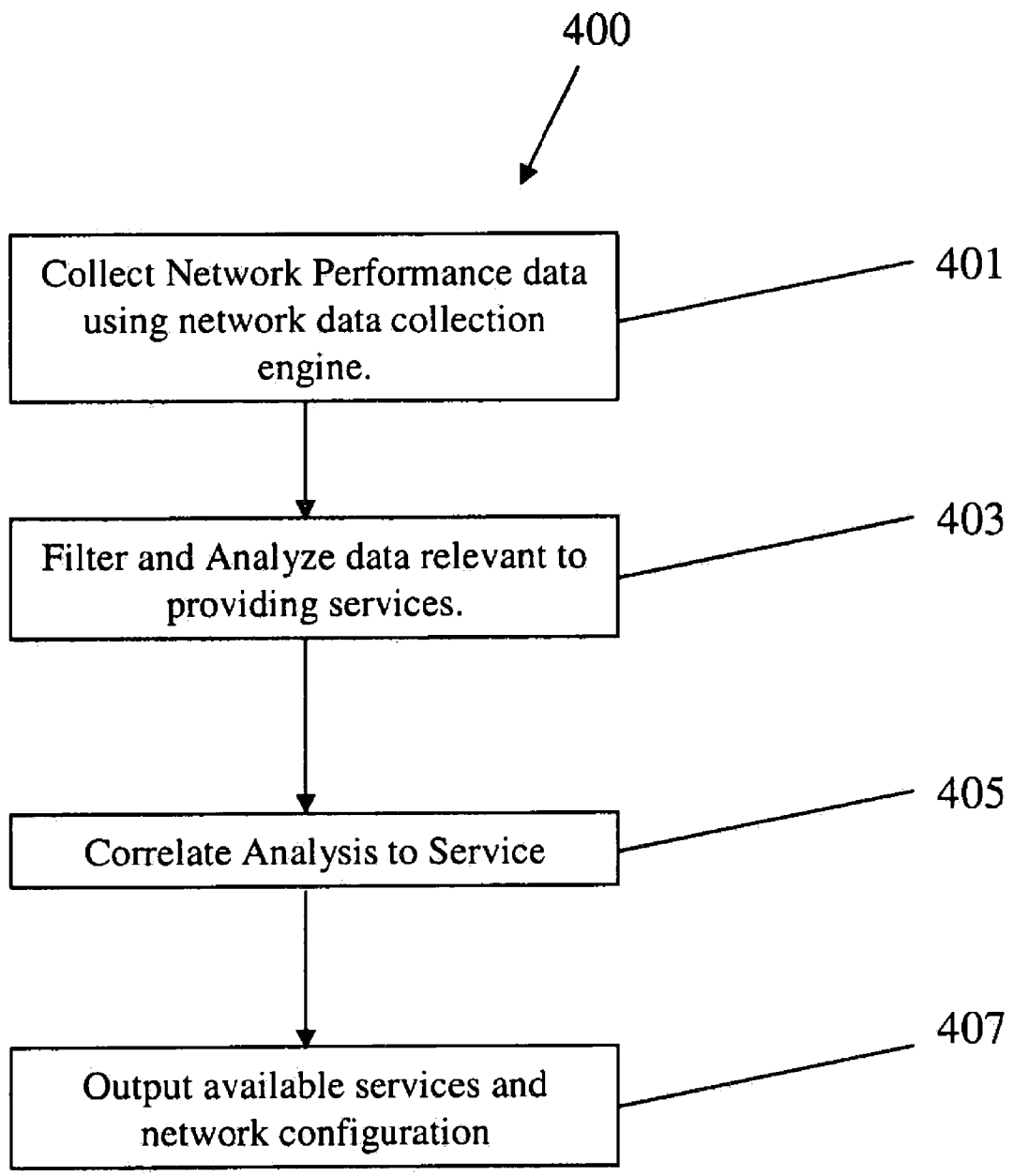
FIG. 4 illustrates a flowchart of the functions performed by the present invention of FIG. 3.

FIG. 4 shows a flowchart 400 of functions performed by an exemplary implementation of the present invention, such as is shown in FIG. 3. In Box 401, the performance parameters of the network are collected, for example, from collection points 123, 106, 104, 103 and 102 as shown in FIG. 1. Collection is performed using one or more well known network data collection engines 301. Collected raw data typically has no interpretation. Raw data is analyzed and filtered in block 310 by the present invention to provide network parameters relevant to provision of services to rules engine 315 and to populate SST table structure 200. This analysis is performed in Box 403, using any statistically valid analysis engine 303 suitable for analyzing network connections which are well known in the art. Use of one or more analysis engines is also possible. The inputs at Box 403 are the raw data from the data collection engines 301, and the output is a set of network parameter settings representing the current state of the network.

In box 405 the present invention uses the rules engine and the SST table structure to correlate performance parameters at the Network Performance Layer to configuration parameters at the Service Layer to determine whether the SP can provide a service to a customer. The output from the different analysis engines 303 provides input to the present invention. The present invention can be configured as a resident service state machine populated with each available service 312 (Service Layer). Based on the network analysis, the Rules Engine 315 determines which service or combination of services can be provided to the subscriber based on the SST structure.

In Box 407, the actions of the Translator provides subscriber information and available services. This information can be used for network provisioning 320, sales and marketing 307 or any other service profile management activities. The Translator therefore provides a flexible bridge for service state changes based on correlating the Network Performance Layer parameters and the Service Layer configurations. The service provider can make each service as complex or as simple as desired. The entrance criteria can be as broad or restrictive as desired. For example, premium services will generally have more defined performance criteria than basic services.

Service state changes can be driven by actions that are either proactive or reactive. Proactive state changes are usually driven by the service provider based on network performance conditions or are a result of changes in the Service Layer. Reactive state changes can be driven by the end user based on their service experience (e.g., reported trouble) or on a request for a product change.

A set of monitored network conditions and associated state changes are now discussed to illustrate operation of the present invention for performing state changes at times $T_0$, $T_1$, $T_2$, $T_3$, and $T_4$. At time $T_0$, a service provider has initially provisioned a single configurable state of "up to 1.5 Mbps downstream×128 kbps upstream" high speed internet access product based on ADSL technology to a customer. Based on the rules engine 315 and analysis input 310 to SST structure 200, rules engine 315 determines user activity on the line would be primarily for web traffic using HTTP. Therefore, a user subscribing to the service has their line initially provided using a fast network channel and an appropriate profile (interleaved delay, MABR). At time $T_1$, based on analysis input to SST table structure, business rules 315 determines the line experiences impairments as a result of impulse noise and white noise conditions. As a result, the present invention sends a high level provisioning directive to the NOC 102 so that, based on analysis input 310, the user service profile is changed to a lower bit rate profile (i.e. 768 kbps downstream× 128 kbps upstream) and interleaved delay adjusted using an interleaved forward error correction profile (a common method of error correction having high latency settings and low error toleration) to automatically adjust for the impairment.

At time $T_2$, based on additional analysis input 310, the user activity has evolved to run both web traffic and Real-Time Transport Protocol (RTP) traffic (a protocol commonly used for gaming applications). The present invention determines that, based on available service offerings in the SST structure 200, since RTP is not latency tolerant, the rules engine prompts the NOC 102 to change the user service profile to an interleaved setting having a lower depth setting to avoid excessive latency. At time $T_3$, the service provider changes their underlying network technology (for example, to another ADSL version) and begins offering services in multiple speed tiers and pricing models. These changes are reflected by repopulating values in the SST table structure 200. With these technology changes on the network side, the user's existing profile is mapped into a new service profile, and the user can be targeted by the rules engine for upselling to a premium tier. That is, the user will be offer a higher speed or higher quality service (guaranteed rate, etc.) based on the new technology. The rules engine can be programmed to look at any parameters for network performance and services and perform any action including but not limited to targeting for upselling. A message can be sent to a marketing OSS at the NOC 102 for targeting the user for upselling or to request that the SP provision or provide a different profile on a customer line to accommodate an impairment encountered during use of a particular service.

At time $T_4$, the user subscribes to a service bundle that includes VoIP with a "guaranteed rate" offering. The user's new service profile reflected in the SST structure 200 is changed to increase "upstream" bandwidth to 512 kbps and the minimum rate in the profile is adjusted up to the guaranteed minimum.

Thus, the present invention provides a configurable abstraction layer structure 200 between the Network Performance Analysis results and the Service Layer. Since the Translator structure 200 abstracts the dependencies between the Network Performance Analysis engine and the Service Layer systems, an SP can choose (or change) any of these performance or service system components without modifying the other components.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for managing services in a network comprising:
   a) specifying an initial service in a network service layer;
   b) specifying at least one network performance criterium criterion for the initial service in a network performance layer wherein the at least one network performance criterion is selected from the group consisting of code violation tolerance, noise margin tolerance, and relative capacity tolerance;
   c) determining a network performance measure;
   d) comparing the network performance measure and the network performance criterion; and
   e) managing the service in the network based on the comparison.

2. The method of claim 1, wherein managing further comprises changing a configurable state in the network service layer to meet the performance criterion.

3. The method of claim 1, further comprising:
   providing the initial service to a network subscriber when the performance criterion is met.

4. The method of claim 1, wherein the initial service comprises one from a list of: i) data transfer, ii) voice transfer, and iii) streaming data over a network connection.

5. The method of claim 1, wherein specifying the initial service further comprises specifying a configurable state for providing the initial service over a network.

6. The method of claim 1, further comprising:
   specifying a secondary service; and
   changing a configurable state to accommodate the initial and secondary service.

7. The method of claim 1, wherein comparing further comprises comparing a network performance measure derived from a physical layer with the at least one network performance criterion.

8. A system for managing services in a network comprising:
   a data base for specifying an initial service and at least one network performance criterion wherein the network performance criterion is selected from the group consisting of code violation tolerance, noise margin tolerance, and relative capacity tolerance; and
   a processor programmed to determine a network performance measure and compare the network performance criterion and the network performance measure to manage the initial service.

9. The system of claim 8, wherein the processor is programmed to change a configurable state of the initial service to meet the performance criteria.

10. The system of claim 8, wherein the processor is programmed to provide the initial service to a network subscriber when the performance criterion is met.

11. The system of claim 8, wherein the initial services further comprises one from a list of: i) data transfer, ii) voice transfer, and, iii) streaming data over a network connection.

12. The system of claim 8, wherein specifying the initial service further comprises specifying a configurable state for providing the service over a network.

13. The system of claim 8, wherein the processor is programmed to specify a secondary service and change the configurable state to accommodate the initial and secondary service.

14. A method of managing a network, comprising:
   maintaining service state data indicative of a service state corresponding to a service, the service state data including a data for a performance parameter and for a configuration parameter corresponding to an aspect of the service;
   receiving performance data indicative of a performance of the network with respect to the performance parameter for which a performance criteria is specified;
   analyzing the performance data with respect to the performance criteria; and
   responsive to determining the performance data satisfies the performance criteria, configuring the aspect of the service consistent with the configuration parameter; and
   providing the service to a network subscriber when the performance criteria is met wherein the service comprises a service selected from the group consisting of: a data transfer, a voice transfer service, and, a streaming service for streaming data over a network connection.

15. The method of claim 14, further comprising specifying a configurable state for providing an initial service over the network.

16. The method of claim 15, further comprising specifying a configurable state; for providing a secondary service over the network.

17. The method of claim 14, wherein the performance data comprises data derived from a physical layer of the network.

* * * * *